United States Patent [19]

Durant

[11] 4,158,508

[45] Jun. 19, 1979

[54] SIGHT GLASS AND PRODUCT CLEANING SYSTEM

[75] Inventor: David R. Durant, White Plains, N.Y.

[73] Assignee: Jacoby-Tarbox Corporation, Yonkers, N.Y.

[21] Appl. No.: 797,177

[22] Filed: May 16, 1977

[51] Int. Cl.² .................... G01B 11/10; G01N 1/34; B08B 3/02

[52] U.S. Cl. .................... 356/385; 134/122 R; 356/36

[58] Field of Search ................. 356/36, 159, 160, 256; 134/9, 15, 122, 198–199; 250/239; 350/319; 425/173, 404, 445

[56] References Cited

U.S. PATENT DOCUMENTS

| 2,069,087 | 1/1937 | Forstrom et al. | 134/122 R |
|---|---|---|---|
| 3,270,364 | 9/1966 | Steele | 134/122 R |
| 3,404,284 | 10/1968 | Doolittle | 250/239 |
| 3,519,831 | 7/1970 | Voigtlaender-Tetzner | 250/560 |
| 3,861,198 | 1/1975 | Shea | 250/239 |
| 3,982,873 | 9/1976 | Graeber et al. | 425/445 |
| 4,007,992 | 2/1977 | Petrohilos | 356/199 |
| 4,074,938 | 2/1978 | Taylor | 356/160 |
| 4,076,175 | 7/1978 | Bert | 134/199 |

FOREIGN PATENT DOCUMENTS 2517710  4/1976  Fed. Rep. of Germany .......... 356/159

Primary Examiner—John K. Corbin
Assistant Examiner—Wm. H. Punter
Attorney, Agent, or Firm—Peck & Peck

[57] ABSTRACT

A system involving a pair of oppositely disposed sight glass units wherein each unit includes an inner glass and an outer glass. One application of these sight glasses is in continuous vulcanization of multiconductor cables in a saturated steam atmosphere. The cable is steam wiped prior to its travel through a chamber between the sight glass units to remove accumulated condensation therefrom. Since the inner surfaces of the glasses of each sight glass unit may be clouded or dirty, wiping means is provided for each wet-side surface to provide and maintain clear and unobstructed viewing to permit scanning of the cable as it passes through the chamber between the sight glass units, and means for sealing the glasses in the units.

1 Claim, 9 Drawing Figures

SIGHT GLASS AND PRODUCT CLEANING SYSTEM

SUMMARY OF THE INVENTION

Sight glasses are broadly designed to make the interior of pressurized or non-pressurized fluid flow lines, tanks, tubes, chambers, processing equipment, or the like, visible from the exterior for various purposes. The sight glasses or safety sight windows, which form a part of the invention, comprise generally a unit which includes an inner glass which is exposed on its inner surface to the tank, tube, chamber, or the like, and an outer glass is spaced from said inner glass. In this particular embodiment of my invention, a chamber, or the like, is provided with a sight glass window unit on opposite sides thereof, such sight glass window units being oppositely disposed.

Each sight glass unit which is typically used in steam service is so designed and constructed to provide, among other characteristics, a combination of improved sealing, longer life and substantially facilitates the maintenance thereof. The structure is such, as will become apparent as this description proceeds, that the unit which may be considered a cartridge will absorb excess forces, and since each window or glass of each unit is in spaced relationship, any rupturing forces which might break the external glass or window would be unlikely to be transmitted to the inner window. Other advantages of the sight glass units will become apparent hereinafter.

Each sight glass unit which is involved in this invention effectively seals against steam pressures and temperatures due to the use of a particular material for the gaskets which are provided for sealing the various components.

One application of such sight glass units which make the interior of a chamber, or the like, exteriorly visible or viewable is in a continuous vulcanization process in the wire and cable industry. It is the usual method in this industry to provide multiconductor cables on which the insulation is extruded on the cable continuously through extruding dies. This process is carried on in a saturated steam atmosphere of approximately 260 psi, 410° F. and this process takes place in a tube with the cable being caused to travel therethrough. In this process, changes in temperatures and pressures within the tube produce condensation of which some clings to the extruded cable. This accumulation of condensation on the cable must be eliminated if the outside diameter of the cable is to be accurately measured. This measurement may be accomplished by Laser scanning through the sight window's glasses as the cable travels through a chamber, the interior of which is visible through the window units. It will be clear that a build-up of condensation on the cable results in a greater cable outside diameter so that erroneous measurement will result if this build-up is not eliminated.

The extruded cable is drawn through the tube by means of a Capstan and then through a chamber for measurement through the sight glass, and the position of the cable within the chamber and with relation to the sight glasses will vary due to increases or decreases in tension resulting from the Capstan speed so that the configuration of the sight glasses may be altered from the purely circular so that the cable will be visible to the measuring means. Of course, in an ideal arrangement and method, the cable will travel in the center of the chamber and the sight glass units.

In order to eliminate the accumulation of condensation on the cable which causes inaccurate measurement of the outside diameter thereof, I have provided ingenious means for wiping this build-up from the cable before the cable travels through the measuring chamber and the structure of this means has been varied to accommodate the various positions the traveling cable may take due to Capstan speed.

In order to maintain clear, unobstructed glasses so that the cable diameter measuring means may be passed through the windows to the cable traveling through the chamber, I have devised an internal window wipe for each of the wet-side glass surfaces of the unit. This is a significant characteristic of this apparatus since the wet-side glass surface must be kept clean and free for the optical clarity required in Laser or other cable measurement. It is also thought to be significant to note that the cleaning of the wet-side glasses also negates erosion caused by condensate droplets running down the inner glass surface. For purposes which will become clear, and to accommodate varying cable traveling positions within the chamber, the glass wiping structure has been varied to suit these conditions.

It is to be distinctly understood that the object or product which is within the chamber and is being scanned through the sight glass windows need not necessarily be a traveling or moving object, and if it is stationary, it will still fall within the spirit and scope of this invention.

Additional objects and advantages of the present invention will become more readily apparent to those skilled in this art when the following general statements and descriptions are read in the light of the appended drawings.

DESCRIPTION OF THE INVENTION

Figure 1:
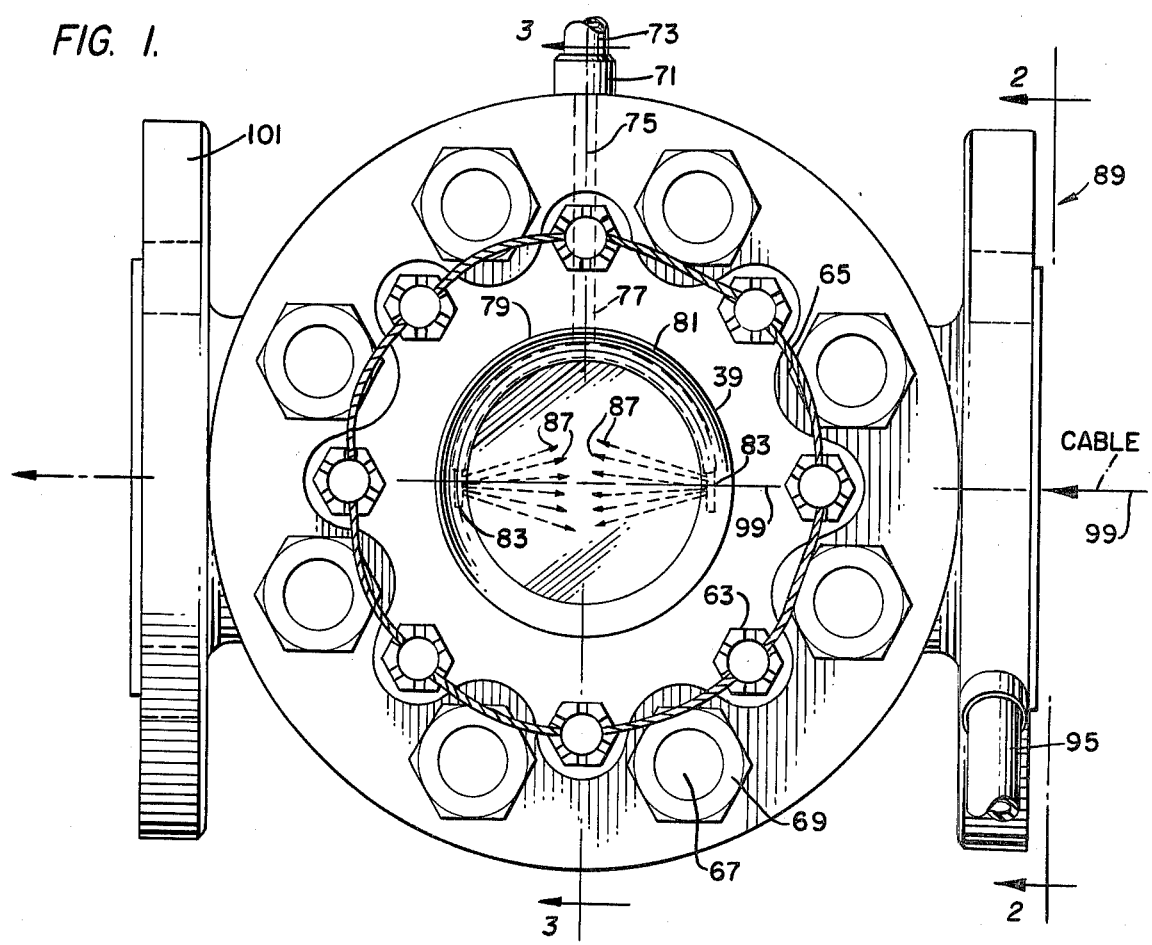
FIG. 1 is a view in elevation looking into the chamber through a sight glass unit and particularly illustrating the means for wiping and cleaning the wet-side of the inner glass of the sight glass unit.
Figure 2:
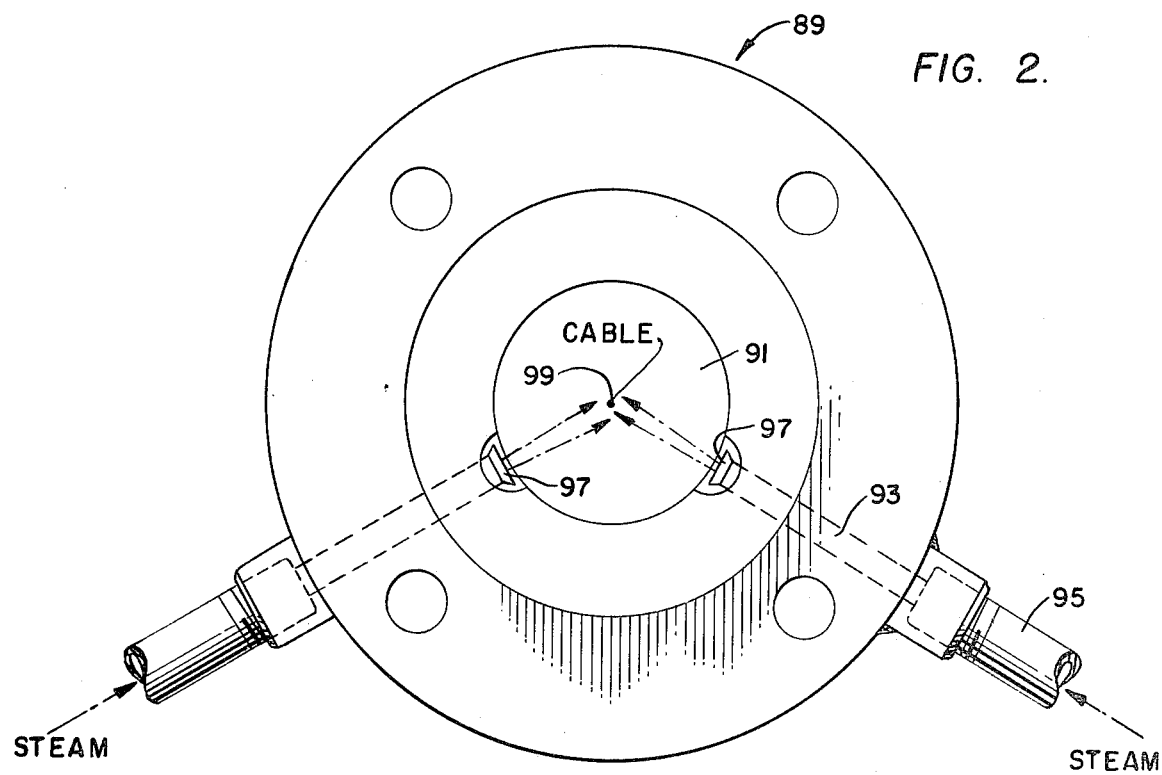
FIG. 2 is a view taken on the line 2—2 of FIG. 1 and particularly illustrating the injection steam wiping means for the cable.
Figure 3:
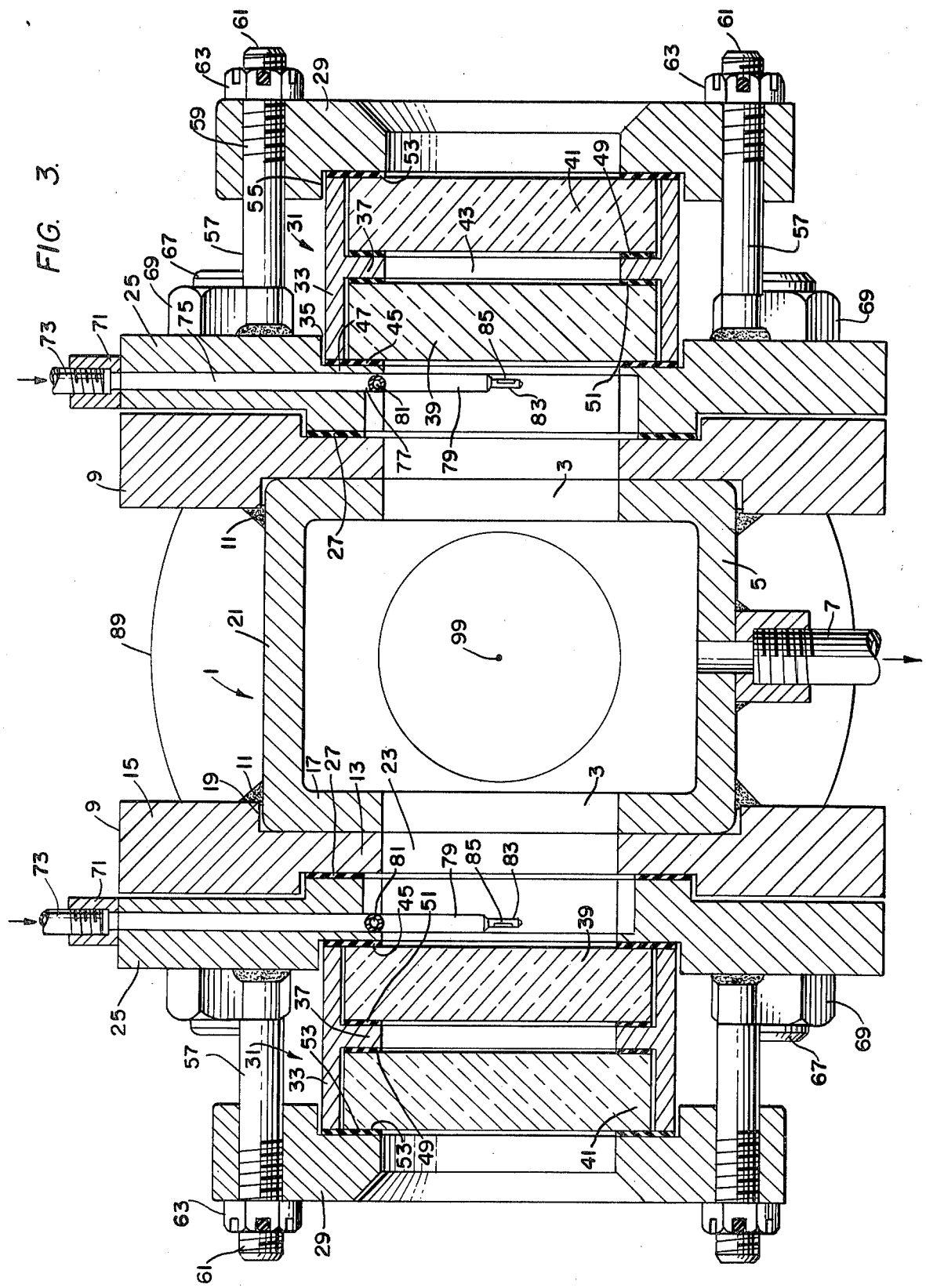
FIG. 3 is a view taken on the line 3—3 of FIG. 1 and particularly illustrating the sight glass cartridge units and also showing the means whereby the wet-side of each inner glass of each unit is wiped clear and clean of any vision blurring material.

In the accompanying drawings, and particularly FIGS. 1-3 thereof, the numeral 1 has been used to designate in its entirety the chamber through which the cable travels in this particular application of the invention, continuously so that it may be measured by Laser scanning or the like through the window units. The chamber 1 is provided with oppositely disposed apertures 3 therein, the apertures being in alignment with one another. In the bottom 5 of the chamber 1, a conventional drain 7 is provided. I provide a pair of annular members 9 which are fixed on and to opposite sides of the chamber 1 as by welding or the like 11. The members 9 are provided with a skirt 13, which depends from an enlarged thickness portion 15. The portion 13 abuts the exterior wall 17 of the chamber 1 and the enlarged thickness outer peripheral portion 15 provides a shoulder 19 which abuts the upper wall 21 of the chamber 1, all as particularly illustrated in FIG. 3 of the drawings. It will be clear that the center free area 23 of the members 9 are in alignment with the oppositely disposed apertures 3 in the chamber 1.

A pair of sight glass window bases 25 are provided and these are of annular construction, the center free areas thereof being in alignment with the apertures 3 and the center free area 23 of the members 9. The bases 25 abut against the members 9 and an annular sealing gasket 27 is positioned between a portion of the members 9 and a portion of the bases 25 as clearly illustrated in FIG. 3 of the drawings. A pair of retainer rings 29 are provided having I.D.'s which are substantially equal to the diameters of the center free areas 23 and the apertures 3 as will be evident as this description proceeds. The retainer ring is adapted to hold the dual sight glass window units in proper positions so that the interior of the chamber 1 is exteriorly visible. Each dual sight glass window unit is disposed on opposite sides of the chamber 1. Each dual sight glass window unit includes a holder designated in its entirety by the numeral 31 which functions to hold and maintain the pair of spaced apart glasses in proper position, as will be clearly explained. The holder 31 comprises a ring or annular member 33 which is preferably of a diameter which is greater than the diameter of the apertures 3 of the center free areas 23, and the O.D. of the holder 31 is substantially the same as the diameter of the area defined between diametrically opposed points on the shoulder 35 which is formed in bases 25. The ring or annulus 33 is of sufficient width to accommodate a pair of spaced apart sight glasses with their sealing means.

Intermediate the width of the ring or annulus 33 is a radially inwardly extending flange 37, the width of which, as will become clear, determines the spacing between the pair of glasses which are used in the sight glass unit or cartridge.

Each sight glass unit includes an inner glass 39 and an outer glass 41 which are mounted on opposite sides of the flange 37 providing a space 43 between the inner and outer glasses. The diameter of the glasses 39 and 41 are substantially the same as the I.D. of the annulus 33.

Consideration of FIG. 3 of the drawings indicates that when a sight glass unit is mounted in operative position, the annulus 33 is disposed within the indentation within the base 25 which is formed by the shoulder 35 and a sealing gasket 45 is disposed between the annulus 33 and a part adjacent to the periphery of the inner glass 39 and is in abutting sealing relationship with a depending portion 47 of the base 25. Further cushion gaskets 49 and 51 elevates the inner and outer glasses with respect to annulus 33. An additional sealing gasket 53 is in abutment with the outer edge of the annulus 33 and a recess formed in the retainer ring 29 due to the shoulder 55 which is formed therein.

In order to hold and maintain the sight glass unit in proper operative position, I provide a plurality of circumferentially spaced apart studs 57 which are fixed to and extend outwardly from the base 25, each of the studs being threaded adjacent their outer ends as at 59. The retainer ring 29 is provided with a plurality of openings therethrough through which the studs 57 extend, the threaded ends of the studs extending beyond the ring 29 as at 61. Threaded on the outer ends of each stud is a captured nut 63 so that by tightening such nut the retainer ring 29 will be brought into abutment with the gasket 53 and the entire sight glass unit will be properly held in its operative position. A locking wire 65 may be threaded to and extend through all of the nuts 63. In order to maintain the bases 25 in desired operative position with respect to the member 9, the latter is provided with a plurality of outwardly projecting studs 67 upon which nuts 69 are threaded to maintain the base 25 in proper position abutting member 9 with the gasket 27 therebetween.

The further detailed description will make it clear that the continuous vulcanization process takes place in a saturated atmosphere of approximately 260 psi, 410° F. and this atmosphere occures in a tube. The ability to effectively seal the sight glass window units against such steam pressures and temperatures has been substantially enhanced through the use of graphite gaskets and my experience has been that the use of such gaskets in a cartridge or unit of this type assures leak free operation. Thus, the gaskets 45, 49, 51 and 53 are formed of a graphite material. As far as I am aware in applications of this general character involving high temperature operations, asbestos base gaskets have been used. However, at steam temperatures, asbestos dehydrates resulting in an extremely hard gasket with little or no resiliency. In setting up the sight glasses of this invention, it will be recognized that high initial bolt loads are required to seal effectively with asbestos gaskets, and retorquing is required with fluctuating pressures and due to aging of the material, it has been discovered that graphite is unaffected by high pressures and temperatures encountered in this service and graphite gaskets will provide leak tight sealing with moderate bolt loads. A resilient seal results with no exhibition of cold flow or creep.

The glass window bases 25 are drilled or otherwise formed to provide a duct from the top thereof through the circumferential inner surface thereof. A nipple 71 is provided on the base 25 and this nipple surrounds the duct in the base and is adapted to threadedly or otherwise receive a steam pipe 73 therein. A steam pipe 75 extends through the duct which is provided in the base 25 and extends slightly beyond the inner circumferential surface of the base as clearly shown at 77. At its lower end the steam pipe 75 and its extension 77 are in communication with a pair of arms 79 and 81. The arms 79 and 81 are of arcuate configuration and the steam from the extension 77 flows through these arcuately configured arms. The two arms 79 and 81 form in effect a semi-circle and at the lower end of each, an injection nozzle 83 is provided having a rectangular aperture 85 therein which is directed toward the wet surface of the inner glass 39. Consideration of the drawings clearly illustrates that the steam pipes, the arms 79 and 81 as well as the nozzles 83 are adjacent to but spaced from the wet surface of the inner glass 39 and since the opening 85 in each nozzle is directed toward the glass 39, it will be recognized that the wet surface of this glass will be subjected to the steam injection for the cleaning thereof for the scanning process which has been set forth above.

It is to be appreciated in the above description that two sight glass window units are provided and that all of the elements specifically disclosed above with respect to one window unit are the same on the other window unit and it is to be further recognized that one window unit and its components is positioned on one side of the chamber 1 while the other window units and its components is located on the opposite side of the chamber 1.

In this particular construction of window wiping, the wiping or cleaning of the wet surface of the inner window is accomplished by injecting jets of steam toward and generally on the center of the wet-side of the inner window, the jet streams being illustrated at 87.

In order to make crystal clear the invention herein described and one specific adaptation thereof, I shall describe the structure, elements and methods utilized in this particular adaptation. What I shall term a cable wiping header is designated generally by the numeral 89. The header is integral or otherwise secured by welding preferably to the member housing, and extends therefrom as is clearly illustrated in FIG. 1 of the drawings. The cable header 89 is of generally circular configuration and is formed with a circular opening or tube extension 91 therethrough, the cable wiping header being so fastened to the apparatus that the opening 91 is lined up generally with the center of the chamber 1 for a purpose which will become apparent. The header 89 is provided with a pair of means in the nature of ducts or steam injection pipes 93 which are supplied with an external source of steam through the pipes 95 and the nozzles 97 inject and direct steam at a 10 to 20 psig differential, the steam being directed to the center of the circular opening 91 through which the cable is traveling.

The cable 99 on which the insulation has been extruded prior to its entrance into the exterior side of the header 89 passes therethrough and through the substantial center of the chamber 1 as clearly illustrated in FIG. 3 of the drawings. It will be evident that with the cable 99 traveling through the substantial center of the chamber 1 that the cable in its traveling path will be in a plane projected from the substantial centers, or diametric centers, of the sight glass windows, which as has been stated are of generally circular configuration. Each end of the chamber 1 being provided with an opening therein (not shown) through which the cable passes, whereupon the cable is drawn by the Capstan or the like through a further or exit header 101. As the cable passes through the circular opening or tube 91 in the header 89 the steam from the nozzles 97 is injected on the cable in substantially the center of such opening 91. Thus the cable is wiped by this steam injection means which removes therefrom any condensation which may cling to the extruded cable to thereby allow accurate measurement of the cable diameter by means of Laser scanning through the sight glass windows which have been wiped clean and clear by the jet streams from the nozzles 83 to insure the passage through the sight glasses of the scanning means.

From the above description it will be clear that the cable 99 travels from the tube where the insulation is extruded continuously on the cable through the extruding dies. As pointed out, this process takes place in a saturated steam temperature and changes in temperatures and pressures within the tube produce condensation some of which stays on the cable. This cable passes from the tube traveling to the left in FIG. 1 and through the cable wiping header 89 so that the build-up of condensation thereon may be wiped from the cable by means of the injection of steam through the nozzles 97 on to the cable which is preferably traveling through the center of the pipe or tube 91. The wiped cable then passes preferably through the chamber between the sight glass window units 31, the wet-side of the glasses 39 being cleaned by the injection of steam through the nozzles 83. The chamber 1 may be drained when desired through the drain 7.

Figure 4:
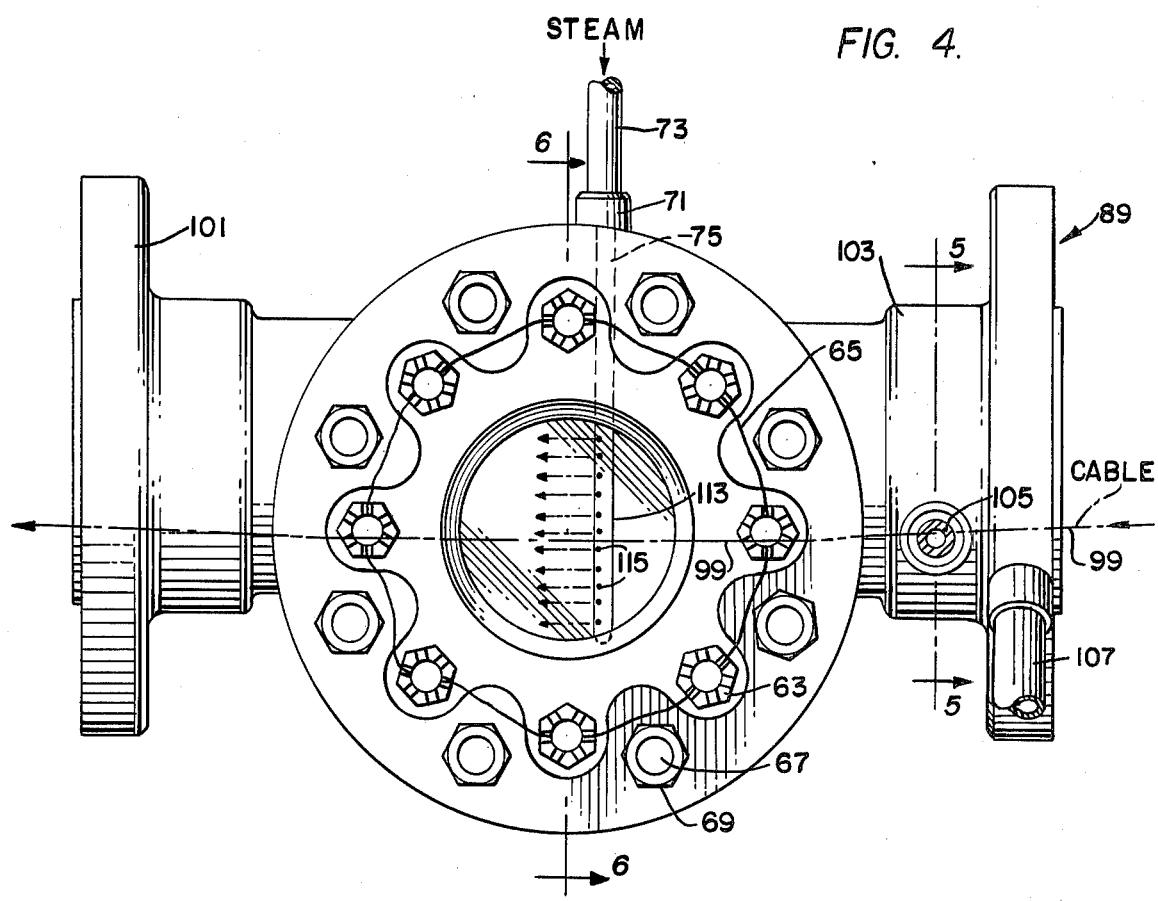
FIG. 4 is an elevational view similar to FIG. 1 of the apparatus and disclosing the cable traveling through the chamber on a line which is in a plane below that illustrated in FIG. 1.
Figure 5:
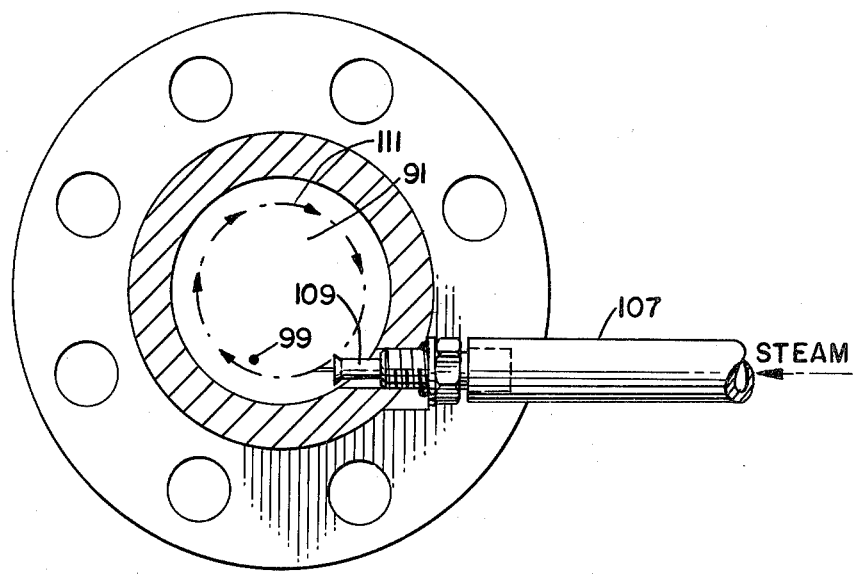
FIG. 5 is a view taken on the line 5—5 of FIG. 4 and particularly illustrating the injection wiping means for the cable.
Figure 6:
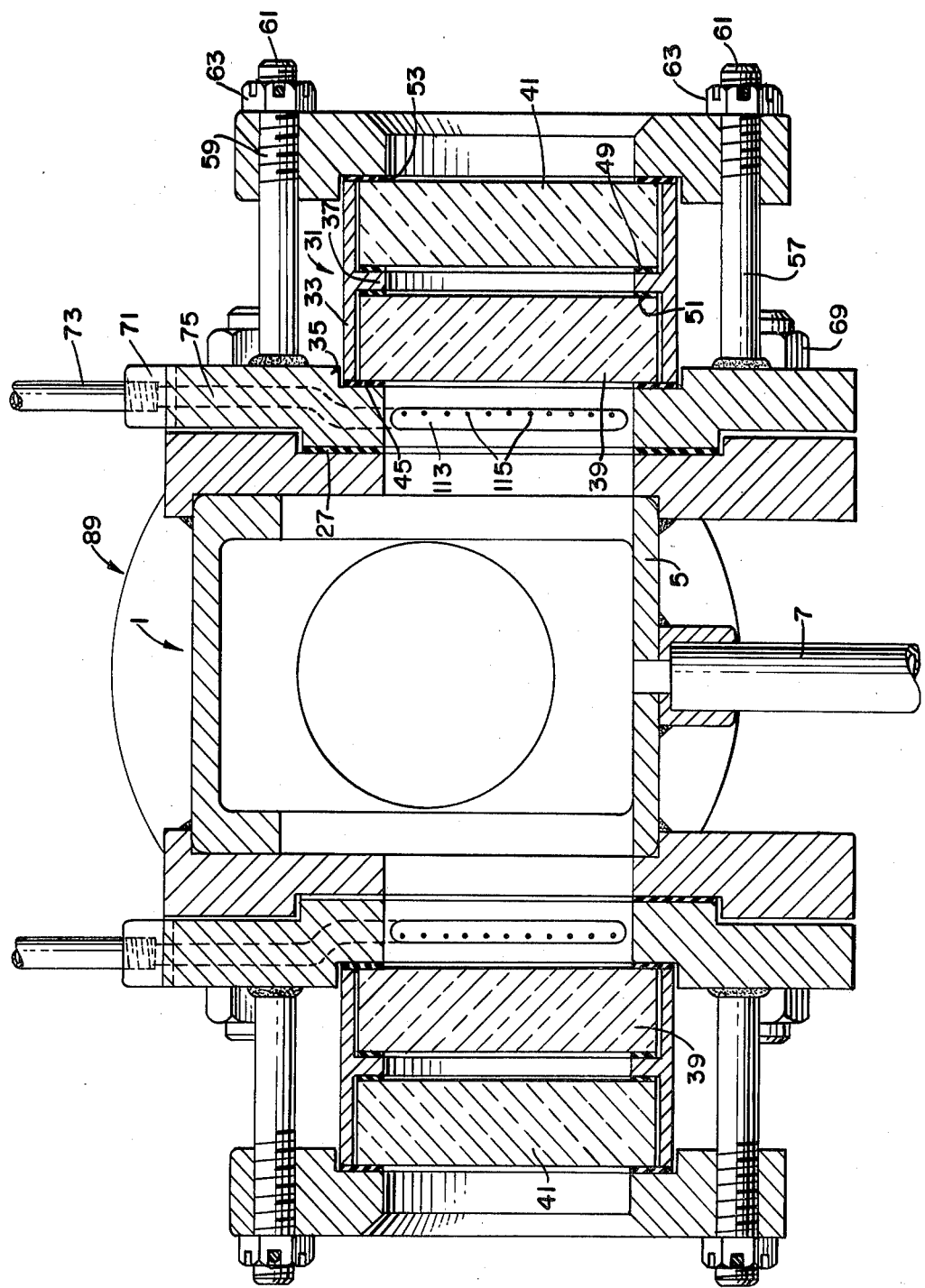
FIG. 6 is a view taken on the line 6—6 of FIG. 4 and particularly illustrating the sight glass cartridge units and also showing the means whereby the wet-side of each inner glass of each unit is wiped clear.

In FIGS. 4-6 the same reference numerals have been used as were used in the description of similar parts in FIGS. 1-3.

The cable wiping header 89 in this variation of the invention is provided with an inner member 103 which is attached thereto in any desirable and suitable manner and this member 103 is provided with a threaded element 105 which properly orients to the cable as it travels therethrough and through the cable wiping header 89. In this instance, the cable 99 does not travel through the center of the tube 91, instead it travels at the pipe or tube I.D. circumference because the cable's normal running position is at this position in the tube. With the cable traveling in such position, as is clearly illustrated in FIG. 5 of the drawings, steam is injected through the header 89 and into the tube 91 by means of a pipe 107 having an injection nozzle 109 which injects the steam adjacent the I.D. of the tube 91, and for cable wiping action the steam taking the general course of travel as described by the arrows 111 in FIG. 5 of the drawings.

As the wiped cable travels in the position shown, it will enter the chamber 1 at the position indicated in FIG. 4 and the wet-surfaces of the window glasses may be cleaned for proper scanning by means of a steam spraying element 113 which extends from and is in communication with the steam injection pipe 75. The length of the steam spraying element 113 adjacent the inner sight glass 39 is provided with a multiplicity of steam ejection apertures 115 directed towards the inner window 39. (See FIG. 6.)

Figure 7:
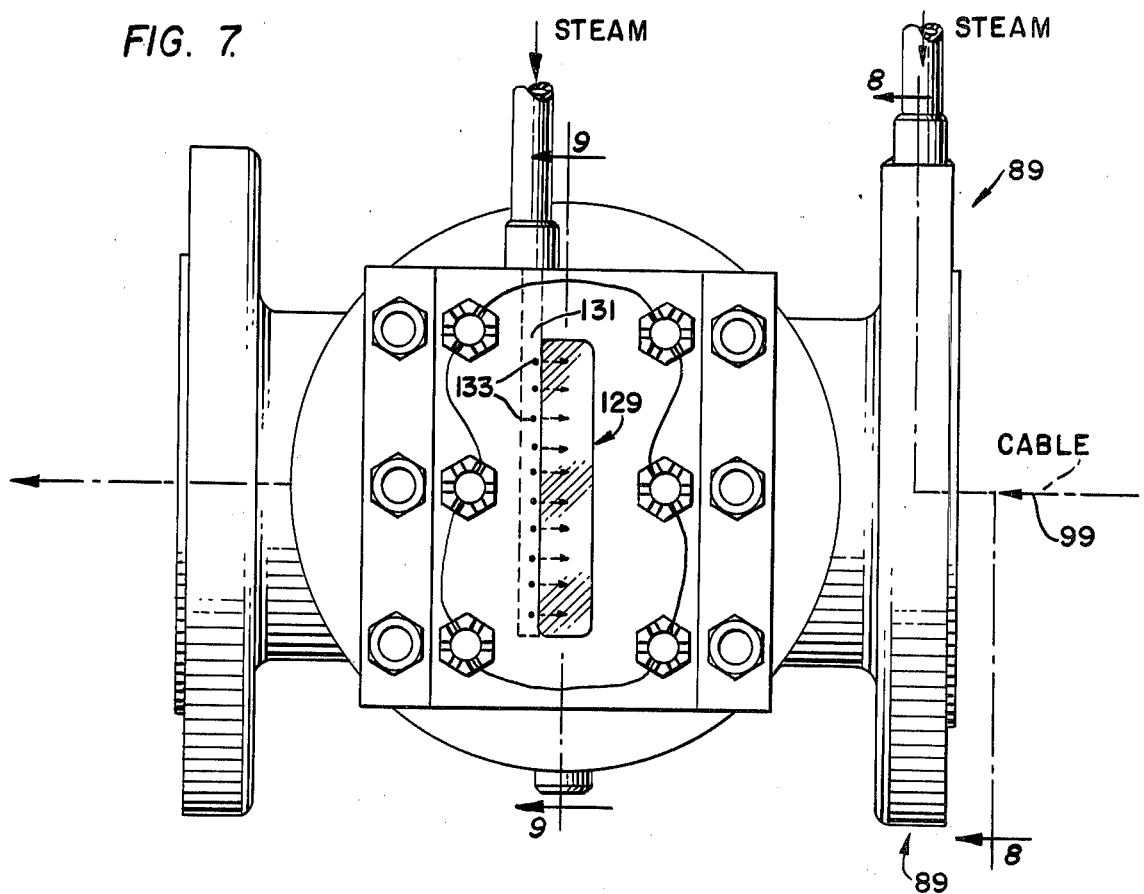
FIG. 7 is a view in elevation of a modified form of my invention wherein the sight glass window units are of a different configuration from those shown before in order to make visible therethrough the cable traveling through the chamber in different vertical positions.
Figure 8:
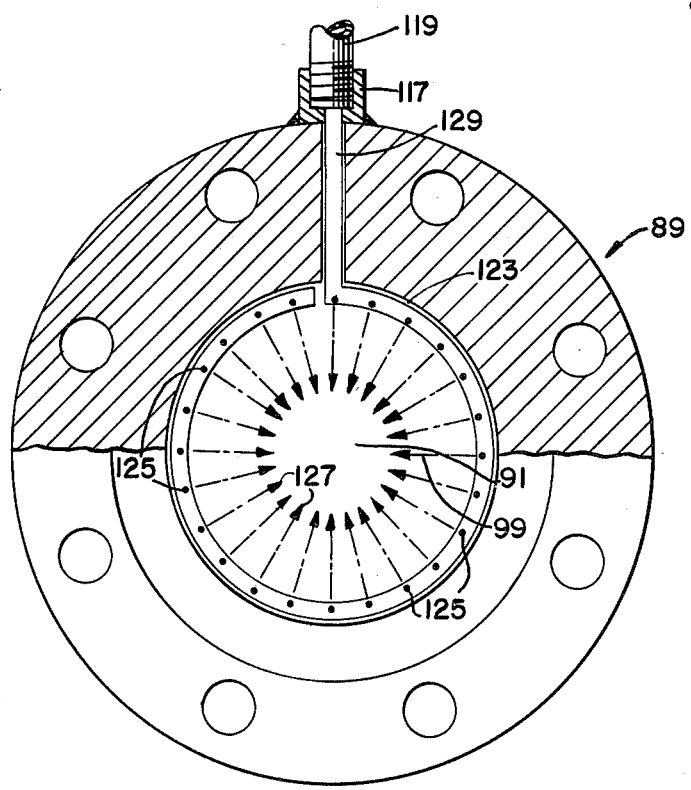
FIG. 8 is a view on the line 8—8 of FIG. 7 wherein the wiping is accomplished by injection a cone pattern to the center of the tube's I.D.
Figure 9:
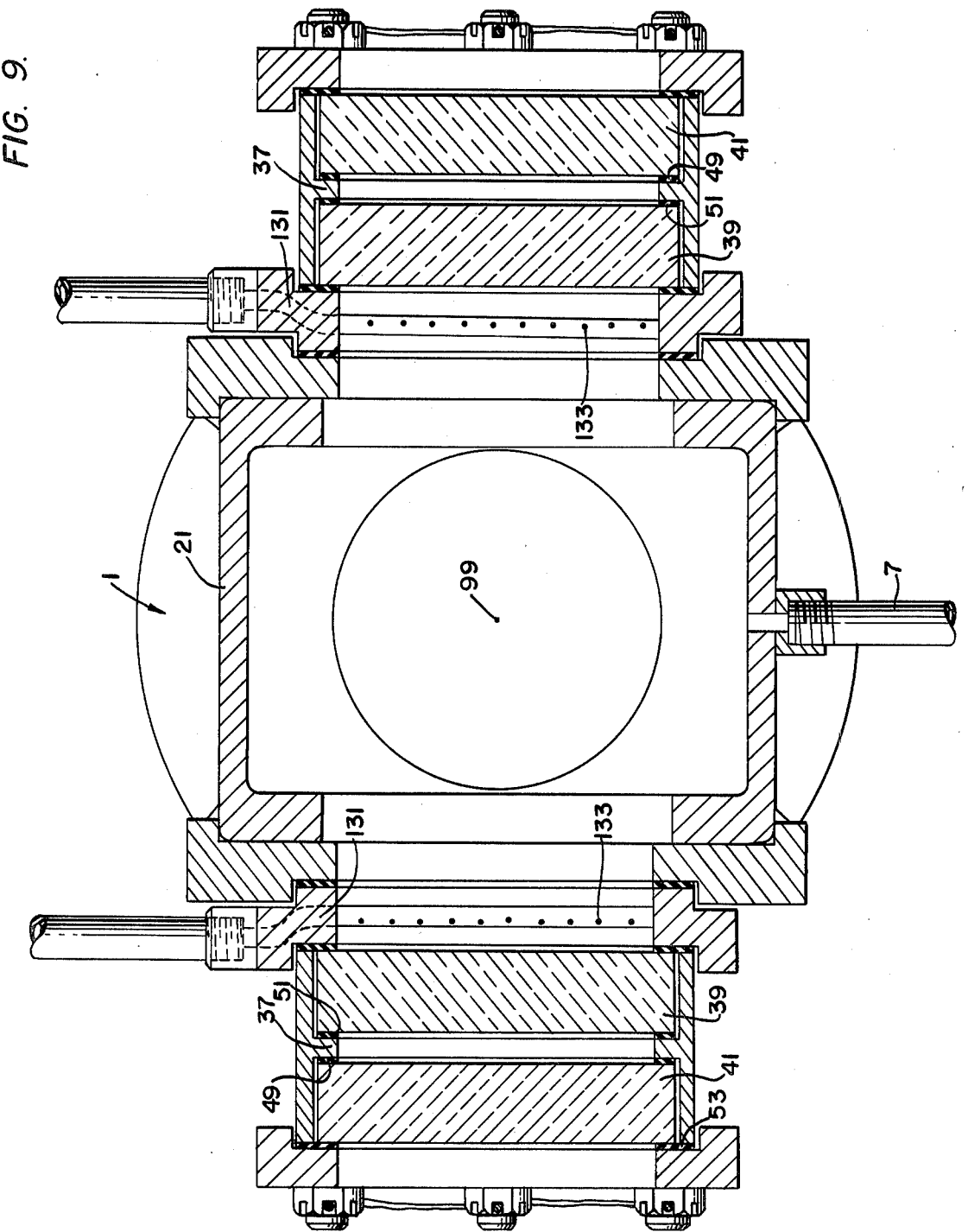
FIG. 9 is a view taken on the line 9—9 of FIG. 7 and particularly illustrating the sight glass cartridge units and also showing the means whereby the wet-side of each inner glass of each unit is wiped clear of condensate.

In FIGS. 7 through 9 a further form which my invention may take has been illustrated and again the same reference numerals as used heretofore have again been used to denote similar parts.

This particular form of my invention provides an apparatus whereby the cable may be measured and wiped in any vertical position within the tube 91 of the header 89. The cable 99 travels from its insulating applying apparatus into the cable wipe header 89 and through the tube. The header has affixed thereto a nipple 117 into which is threaded or otherwise affixed a steam injection pipe 119 which extends through the injection means 129 and into the tube 91 through which the cable 99 is traveling. The injection means 129 extends into the tube 91 and is then formed of circular configuration as at 123 extending about the I.D. of the tube 91 as clearly shown in FIG. 8. A multiplicity of steam injection apertures 125 are formed in the circular pipe 123 and directs steam to wipe the cable and this steam is injected in a cone pattern outward to the center of the tube as shown at 127 so that the traveling cable will be wiped by these jet streams at any vertical position within the tube 91.

As illustrated particularly in FIG. 7, the dual sight glass window units are designated generally by the numeral 129 and are of elongated rectangular or oblong configuration so that the cable traveling through the chamber 1 will be exteriorly visible for scanning in any vertical position. As in the former variations of my invention, the wet-side of the inner windows are wiped clean along their entire surfaces by means of steam flowing through a steam pipe 131 provided with a multiplicity of steam injection perforations 133 along the entire window length to subject the entire window length to the cleaning action of the steam.

What is claimed is:

1. A system for measuring the true outer diameter of a cable, including a stationary chamber having oppositely disposed apertures in opposite walls thereof, said cable being positioned in the chamber between the apertures, oppositely disposed window units in opposite sides of said chamber in line with said apertures therein and spaced from said chamber making the interior thereof visible from the exterior of said chamber, said cable being positioned between said window units, said window units including oblong shaped elements which are formed of transparent material, the interior of said chamber being subjected to steam, mounting means for connecting said window units to said chamber in spaced relation thereto and said mounting means includes a steam injection unit comprising a pipe extending into said area and extending therein to substantially the lower end of said oblong shaped transparent element, said pipe including a series of spaced apart perforations in the length thereof adjacent to said oblong shaped transparent element, the perforations being directed toward said oblong shaped transparent element directing steam in a linear pattern thereagainst said cable having had insulation applied thereto in a saturated steam atmosphere and mechanism connected to said cable causing travel thereof from and out of the saturated steam atmosphere and through said chamber, said cable traveling through said chamber at any point therein within the projected plane of said transparent oblong shaped element, whereby said cable will be visible at any such point through said transparent oblong shaped element.

* * * * *